Feb. 11, 1930.  DE WITT TAPPAN ET AL  1,747,146
ENGINE STARTING MECHANISM
Filed Nov. 6, 1928

Inventors
DeWitt Tappan
Farnum F. Dorsey
Attorney and pro se.

Patented Feb. 11, 1930

1,747,146

UNITED STATES PATENT OFFICE

DEWITT TAPPAN AND FARNUM F. DORSEY, OF ROCHESTER, NEW YORK, ASSIGNORS, BY MESNE ASSIGNMENTS, TO NORTH EAST APPLIANCE CORPORATION, OF ROCHESTER, NEW YORK, A CORPORATION OF NEW YORK

ENGINE-STARTING MECHANISM

Application filed November 6, 1928. Serial No. 317,654.

This invention relates to mechanism for starting an internal combustion engine, by power derived from an electric motor or other source.

In mechanism for the purpose in question, it is common to provide the flywheel of the engine with a ring of gear teeth and to connect the motor with the engine, at the time of starting, by means of a pinion which is moved axially along a splined shaft driven by the motor, this axial movement of the pinion bringing its teeth into mesh with those on the flywheel. To produce the axial movement of the pinion, it is common to provide it with a slotted collar engaged by a forked lever, this lever being pivoted on the wall of a housing which incloses the pinion and its shaft. The lever extends to the outside of the housing and is manually operated in any convenient manner.

In such a construction such as just described, the pinion housing is attached to the flywheel housing of the engine, and has an opening, at its inner end, to permit engagement of the pinion and the gear ring, while the outer part of the housing is necessarily provided with an opening for the reception of the shifting lever. It is desirable that this last mentioned opening be fitted as closely as possible by the lever, or parts associated therewith, in all positions of the lever, to prevent the admission of dirt to the pinion housing and thence into the flywheel housing of the engine.

One object of the present invention is to provide a novel construction for the shift lever and the housing, with respect particularly to the parts adjacent the pivotal support of the lever, by which a close joint may be provided at this point in a simple and inexpensive manner, and with a minimum number of parts which may be easily assembled or disassembled.

Another object of the invetnion is to provide simple and convenient means for retaining in place the pivot pin, upon which the shifting lever is mounted.

To the foregoing ends the invention consists in the construction illustrated in the accompanying drawings and hereinafter described, as it is defined in the annexed claims.

Figure 1:
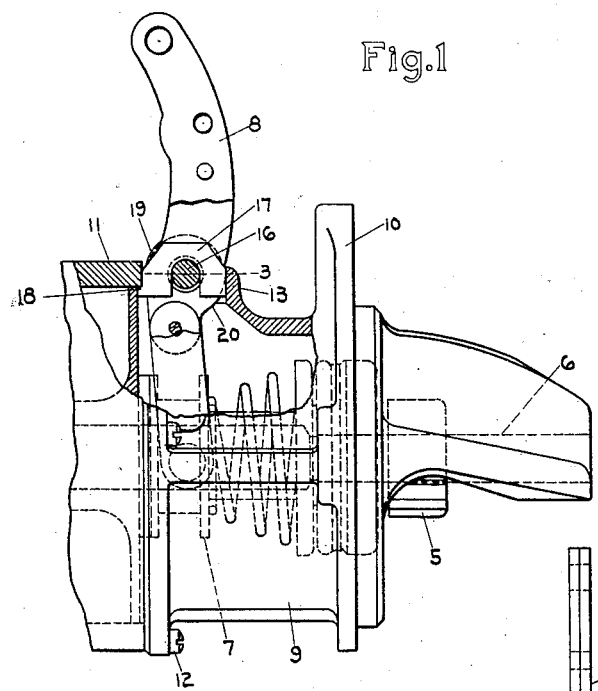
Figure 2:
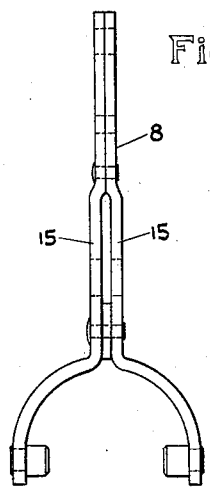
Figure 3:
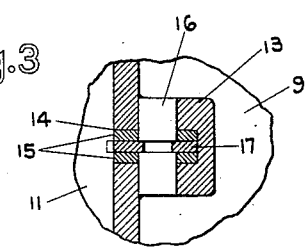

In the accompanying drawings Fig. 1 is a side elevation, partly in vertical section, of engine-starter mechanism embodying the present invention. Fig. 2 is a front elevation of the pinion-shifting lever, and Fig. 3 is a detail sectional view, on a horizontal plane indicated by the line 3 in Fig. 1.

The invention is illustrated as embodied in mechanism in which a pinion 5 is mounted to slide upon a power shaft 6. The pinion is connected with an extension having a slotted portion 7, for engagement with the forked end of the shift lever 8. The shaft 6 is journaled in a housing member 9, which incloses the pinion and the parts immediately associated therewith, and this housing member has the usual flange 10, by which it may be secured to the flywheel housing of the engine.

Associated with the housing member 9 is a second housing member 11. In the present instance this member 11 is the housing or field ring of an electric motor. No details of the construction of the motor are shown, as it may be of any ordinary or suitable form. The housing member 11, whether or not constituting a part of a motor, is secured to the housing member 9, end to end, by means of screws 12, in the usual manner.

The only novel feature of the housing member 9 resides in the manner in which it is provided with an opening for the admission of the shifting lever 8. For this purpose it has heretofore been customary to provide a lateral perforation in the housing member, by either coring or boring an opening in the casting. Where such opening is cored it is unavoidably irregular in form, so that it is not practicable, in commercial manufacture, to fit the lever closely to the opening. Where the opening is bored into the casting, the lever may be closely fitted in the opening, but only by the use of a relatively expensive formation in the lever at this point. In either case it is necessary, in assembling the parts, to pass the lever endwise into and through the opening from the inside of the housing member.

In the present construction the opening for the lever is provided by slotting the housing member 9 inwardly from its open end. The housing member has an upwardly projecting portion or enlargement 13, and the slot 14 may be easily and inexpensively formed therein, by means of a simple milling operation. The slot so formed is uniform and accurate with respect to its dimensions, and may also be accurately related to the other parts of the mechanism.

Since the slot 14 extends inwardly from the end of the housing member 9, the open end of the slot is adjacent the end of the second housing member 11. Consequently, when these members have been secured together there is provided an opening, of rectangular form, in which the shifting lever may be seated and to which it may be accurately fitted without difficulty or expense. Furthermore, since the slot extends to the end of the housing member 9, the lever may be introduced laterally into the slot before the housing members are secured together, so that it is not necessary that the outer end of the lever be free from extensions or attachments of greater diameter than the opening in which the lever is mounted.

The shifting lever may be conveniently formed of two pieces of sheet metal, bent as shown in Fig. 2, and secured together by rivets or otherwise. The middle portions 15 of these sheet metal members are perforated to receive a pivot pin 16, and this pin is removably seated in a perforation, which may be drilled transversely through the slotted part 13 of the housing member 9. The parts 15 of the lever are parallel with each other and are spaced somewhat apart, and they preferably fit closely against the sides of the slot, as shown in Fig. 3. These parts 15 are also preferably made with arcuate edges 19 and 20, as shown in Fig. 1, so that in all positions of the lever the edges of the metal will fit closely against the surfaces which define the ends of the opening in which the lever moves.

In addition to the features just described, the invention comprises a simple device for securing the pivot pin 16 normally in place. For this purpose, the pin is transversely grooved, as shown in Fig. 3, and a pin retainer is provided in the form of a sheet-metal member 17. This retainer is notched from the bottom so as to embrace the pivot pin, and has an edgewise engagement with the groove in the pin. The pin retainer lies in and closely fits the space between the parallel members 15 of the shifting lever, so that the pin retainer and the lever completely fill the slot 14, except for the slight necessary working clearances.

As a convenient means for holding the pin retainer in place, it is provided with a projection 18, which lies within and beneath the upper portion of the housing member 11. So long as the housing members are secured together the lever, the pivot pin and the pin retainer constitute an interlocked assembly, in which all the parts are held positively against disarrangement. Upon removal of the housing member 11, however, the pin retainer 17 may be slid upwardly in the space between the lever members 15, so as to disengage the pivot pin. The pin may then be moved endwise out of the perforation in which it is seated, whereupon the lever may be withdrawn laterally from its slot in the housing member 9.

The invention claimed is:

1. The combination of two housing members secured together end-to-end, one of said members having an open end and a parallel-sided slot extending inwardly from said end, the outer end of the slot being adjacent the end surface of the second housing member, and a shifting lever pivotally mounted in said slot and having arcuate edges in close clearance relation, respectively, with said end surface and the inner end of the slot.

2. The combination of a housing member provided with a slot and with a perforation extending transversely through its slotted portion, a transversely grooved pivot pin removably seated in said perforation, a shifting lever extending through said slot and pivotally mounted on said pin, and a pin-retaining member engaging the groove in the pivot pin and seated in said slot.

3. The combination of a housing member provided with a slot and with a perforation extending transversely through it slotted portion, a transversely grooved pivot pin removably seated in said perforation, a shifting lever having a sheet-metal arm extending through said slot and pivoted on said pin, and a sheet-metal pin retainer lying in said slot alongside the sheet-metal of the arm and having edgewise engagement with the groove in the pivot pin.

4. The combination of two housing members secured together end-to-end, one of said members having an open end and a slot extending inwardly from said end, the outer end of the slot being adjacent the end of the second housing member, the first housing member having also a perforation extending transversely through its slotted portion, a transversely grooved pivot pin removably seated in said perforation, a shifting lever extending through said slot and pivotally mounted on said pin, and a sheet metal pin retainer having edgewise engagement with the groove in the pivot pin and having a part in interlocking engagement with the second housing member whereby it is normally retained within the slot.

5. The combination of a housing member provided with a slot and with a perforation extending transversely through its slotted portion, a transversely grooved pivot pin removably seated in said perforation, a shifting lever extending through said slot and pivotally mounted on said pin, the part of the lever adjacent the pin comprising two parallel sheet-metal members spaced apart laterally, and a sheet metal pin retainer embraced between the parallel members of the lever and having edgewise engagement with the groove in the pivot pin.

DEWITT TAPPAN.
FARNUM F. DORSEY.